(12) United States Patent
Lim

(10) Patent No.: US 9,262,946 B2
(45) Date of Patent: Feb. 16, 2016

(54) PROFILES USED IN GENERATING CHANNEL LETTERS

(71) Applicants: Seoul Laser Dieboard System Co., Ltd., San Diego, CA (US); Seoul Laser Dieboard System Co., Ltd., Kwong-gi-Do (KR)

(72) Inventor: Kyong-Chan Lim, San Diego, CA (US)

(73) Assignee: SEOUL LASER DIEBOARD SYSTEM CO. LTD, San Diego, CA (US)

( * ) Notice: Subject to any disclaimer, the term of this patent is extended or adjusted under 35 U.S.C. 154(b) by 0 days.

(21) Appl. No.: 14/632,275

(22) Filed: Feb. 26, 2015

(65) Prior Publication Data

US 2015/0170553 A1    Jun. 18, 2015

Related U.S. Application Data

(63) Continuation-in-part of application No. 13/458,883, filed on Apr. 27, 2012, now Pat. No. 9,126,252, which is a continuation-in-part of application No. 13/133,133, filed on Jan. 10, 2012.

(51) Int. Cl.
*G09F 7/16* (2006.01)
*B32B 37/12* (2006.01)
(Continued)

(52) U.S. Cl.
CPC ........ *G09F 7/16* (2013.01); *B21D 11/08* (2013.01); *B32B 37/1284* (2013.01);
(Continued)

(58) Field of Classification Search
CPC ...... B21D 28/10; B21D 28/26; B21D 28/265; B21D 35/001; B21D 39/02; B21D 51/06; B21D 51/52; B21D 53/74; G09F 7/00; G09F 7/16; G09F 7/165; G08F 2013/1881; Y10T 29/49906; F09F 7/16; F09F 7/00; B32B 37/1284; B32B 37/1292; B32B 37/18
See application file for complete search history.

(56) References Cited

U.S. PATENT DOCUMENTS 2,006,925 A * 7/1935 Klemp ................. B21D 53/74
150/126
2,539,095 A * 1/1951 McMath ................. G09F 7/14
40/616

(Continued)

FOREIGN PATENT DOCUMENTS

JP    07-251387    10/1995
JP    8-30050 A    11/1996
(Continued)

OTHER PUBLICATIONS

Extended European Search Report for EP 08847169.3, issued by the European Patent Office, mailed on Mar. 16, 2015.
(Continued)

*Primary Examiner* — Jason L Vaughan
(74) *Attorney, Agent, or Firm* — Procopio, Cory, Hargreaves & Savitch, LLP

(57) ABSTRACT

A profile for making channel letters is disclosed. The profile can have a rule having a top edge, a bottom edge, a first surface, and a protective coating. The top edge and the bottom edge can be separated by a profile height. The first surface can describe an interior surface of a completed channel letter. The profile can also have a first rib bonded to the first surface with an adhesive. The first rib can be disposed parallel to a profile axis and separated from the top edge by a face plate thickness. The first rib can be configured to receive one or more cuts allowing the profile to bend and form the channel letter. The profile can be made by bonding the first rib to the rule using an adhesive.

13 Claims, 10 Drawing Sheets

(51) Int. Cl.
*B32B 37/18* (2006.01)
*B21D 11/08* (2006.01)
*G09F 7/00* (2006.01)

(52) U.S. Cl.
CPC ................ *B32B 37/18* (2013.01); *G09F 7/00* (2013.01); *B32B 2590/00* (2013.01); *Y10T 29/49906* (2015.01); *Y10T 156/10* (2015.01); *Y10T 428/2457* (2015.01)

(56) References Cited

U.S. PATENT DOCUMENTS

| | | | | |
|---|---|---|---|---|
| 3,284,889 | A * | 11/1966 | Flitman | G09F 7/14 264/171.18 |
| 4,392,317 | A * | 7/1983 | Boothman | G09F 7/16 40/618 |
| 4,490,447 | A * | 12/1984 | Battersby | H01M 2/145 429/143 |
| 5,456,099 | A * | 10/1995 | Lipari | B21D 5/004 72/12.1 |
| 5,799,557 | A | 9/1998 | Wang | |
| 6,748,686 | B2 * | 6/2004 | Grate | G09F 13/0404 40/552 |
| 7,546,793 | B2 * | 6/2009 | LaSusa | B23P 15/00 83/522.19 |
| 2004/0031177 | A1 * | 2/2004 | Gordon | G09F 7/16 40/551 |
| 2005/0005746 | A1 * | 1/2005 | Linenberger | B21D 11/08 83/39 |

FOREIGN PATENT DOCUMENTS

| | | |
|---|---|---|
| JP | 2002-178040 A | 6/2002 |
| KR | 1002333350000 | 12/1999 |
| KR | 1003888890000 | 6/2003 |
| KR | 10-2003-0043131 | 6/2004 |

OTHER PUBLICATIONS

International Search Report and Written Opinion dated Jun. 24, 2009 from International Patent Application No. PCT/US2008/082371, in 10 pages.

* cited by examiner

PROFILES USED IN GENERATING CHANNEL LETTERS

CROSS-REFERENCE TO RELATED APPLICATIONS

This application is a continuation-in-part of co-pending U.S. patent application Ser. No. 13/458,883, filed Apr. 27, 2012, entitled "Generating Channel Letters Using Profiles," which is a continuation-in-part application of U.S. patent application Ser. No. 13/133,133, filed Jan. 10, 2012, and entitled "Methods and Apparatus for Cutting Profiles," which is a National Stage Entry of PCT Application No. PCT/US08/82371, filed Nov. 4, 2008, and which claims priority under U.S.C. §119(e) to U.S. Provisional Patent Application No. 61/479,773, filed Apr. 27, 2011, entitled "Channel Letters," and to U.S. Provisional Patent Application No. 61/480,269, filed Apr. 28, 2011, entitled "Channel Letters." The disclosures of the above-referenced applications are incorporated herein by reference.

BACKGROUND

1. Technological Field

The present disclosure relates to channel letters, and more specifically, to profiles used for generating channel letters.

2. Background

Metal rules used in manufacturing channel letters can be flat metal strips that are cut at one or more edges and flanged to provide structural support. However, flat metal rules are limited in their ability to provide neatly finished channel letters as the resulting channel letter can require a cover that wraps over the un-finished edges of the completed channel letter.

SUMMARY

Certain embodiments as disclosed herein provide for forming a channel letter box using a profile. The systems, methods and devices of this disclosure each have several innovative aspects, no single one of which is solely responsible for the desirable attributes disclosed herein.

One aspect of the disclosure provides a method of forming a profile for making a channel letter is provided. The method can include providing a rule. The rule can have a profile axis, a top edge, a bottom edge, a first surface, and a protective coating. The top edge and the bottom edge can be separated by a profile height. The method can further include selecting a first location for bonding a first rib to the rule. The first location can be parallel to the rule axis on the first surface and spaced a face plate thickness from the top edge. The at least one rib can be formed from a polymer. The method can also include applying an adhesive to the first location on the first surface. The method can also include applying the first rib to the first location. The adhesive can make a permanent bond between the first rib and the rule.

Another aspect of the disclosure provides a profile for making a channel letter. The profile can have a rule having a top edge, a bottom edge, a first surface, and a protective coating. The top edge and the bottom edge can be separated by a profile height. The first surface can describe an interior surface of a completed channel letter. The profile can also have at least one rib bonded to the first surface with an adhesive. The first rib can be disposed parallel to a profile axis. A first rib of the at least one rib can be separated from the top edge by a face plate thickness. The first rib can be configured to receive one or more cuts. The cuts can allow the profile to bend and form the channel letter.

Another aspect of the disclosure provides a profile for making a channel letter. The profile can have a rule. The rule can have a top edge, a bottom edge, a first surface, and a protective coating. The top edge and the bottom edge can be separated by a profile height. The profile can also have a first rib bonded to the first surface, the first rib being disposed parallel to a profile axis and separated from the top edge by a face plate thickness. The profile can also have a second rib bonded to the first surface. The second rib can be disposed parallel to the profile axis and between the bottom edge and the first rib. The first rib and the second rib can both be configured to receive one or more cuts substantially transverse to the profile axis. The cuts can allow the profile to bend and form the channel letter.

Other features and advantages of the present disclosure will become more readily apparent to those of ordinary skill in the art after reviewing the following detailed description and accompanying drawings.

BRIEF DESCRIPTION OF THE DRAWINGS

The details of the present disclosure, both as to its structure and operation, may be gleaned in part by study of the accompanying drawings.

DETAILED DESCRIPTION

Figure 1:
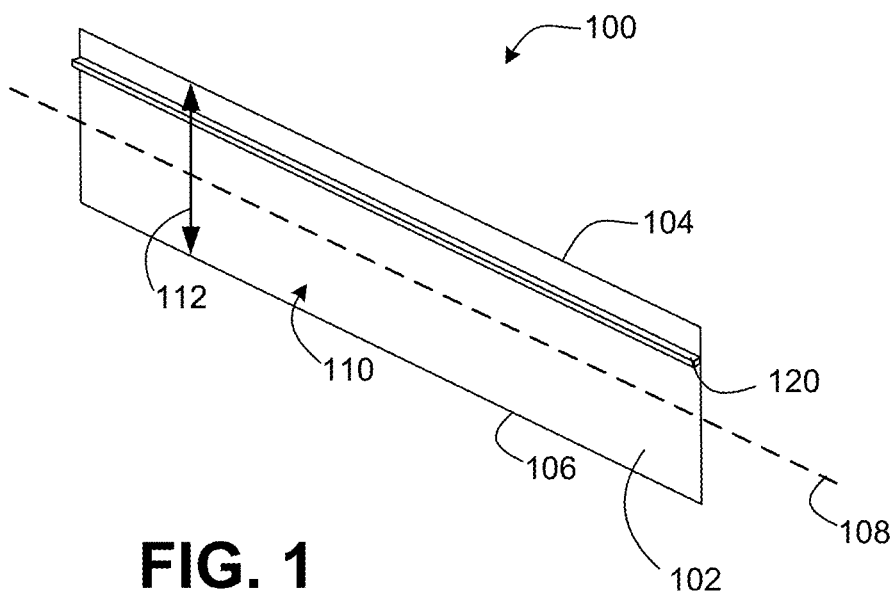
FIG. 1 is a perspective view of a profile having one rib.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description. As used herein, like reference numerals refer to like features throughout the written description.

FIG. 1 is a perspective view of a portion of a profile. As shown, a profile 100 can comprise a rule 102. As described herein, a "rule" may generally refer to a flat metallic strip. Additionally, a "profile" as used herein may generally refer to the rule 102 having a rib 120 as described herein.

The profile 100 can have a first edge, or a top edge 104 and a second edge, or bottom edge 106. The top edge 104 and the bottom edge 106 may generally define a rectangular shape. The top edge 104 and the bottom edge 106 can be parallel to a profile axis 108. The profile axis 108 may be a longitudinal axis of the profile, between the top edge 104 and the bottom edge 106 of the profile 100.

In some embodiments, the profile 100 can further have a first surface 110. The first surface 110 may also be referred to herein as a front surface or "inside surface," indicating that the first surface 110 may generally become the inside of a resulting channel letter once the profile 100 has been cut and folded. The profile 100 (or the rule 102) can generally have a profile height 112 on the order of a few centimeters (cm), for example, one or two cm to in excess of 20 cm. The profile height 112 can also describe the height of the first surface 110. The profile 100 may also be many meters long (in the direction of the profile axis 108). As described below in connection with FIG. 5, the profile 100 (and the rule 102) can be stored in large rolls from which certain portions or lengths can be cut, for example, to produce the portion of the profile 100 shown. Lengths or sections of the profile 100, can be cut from the rolls and then fed into a profile cutting and bending machine (not shown) to make a variety of channel letters or shapes from the profile 100.

In some embodiments, the rule 102 can be formed of a suitable metallic material, such as aluminum, steel, stainless steel, or various other alloys that provide a malleable, yet sturdy construction. The rule 102 may further have a protective coating to prevent corrosion or oxidation and to provide a suitable mounting surface for the rib 120. Such a protective coating can be applied at least to the first surface 110, but can also be applied to an outside surface (not shown). The outside surface is opposite the first surface 110 and may generally become the outside of the resulting channel letter once the profile 100 is cut and folded. In certain embodiments, such a protective coating may be an enamel coating. In some other embodiments, the profile 100 can be coated with certain types of powder coating, lacquer, or paint applied to the entire rule 102. In some embodiments, coating the rule 102 in enamel can have certain chemical advantages for adhering or bonding of the rib 120 as described below in connection with FIG. 6. The coating can further have desirable artistic or design characteristics provided by different colored coatings having various reflective or textured properties. For example, a white first surface 110 may have desirable reflective properties for light emitted from within a completed channel letter. The colors and coatings of the first surface 110 can be different from the colors and coatings of the outside surface.

The profile 100 can further have the rib 120. The rib 120 can be one of several ribs as shown below in the following figures. In some embodiments, the rib 120 can be attached, bonded, or otherwise adhered to the rule 102. In some embodiments, the rib can be formed of a polymer, elastomer, plastic, fiber-reinforced plastic (FRP), or other suitable synthetic materials. In some other embodiments, the rib 120 can be attached using a machine that applies or adheres the rib 120 in place upon a blank rule 102.

Once the profile 100 is cut (see FIG. 11) and folded (see FIG. 15) the rib 120 can provide a mounting point for a face plate (see FIG. 9 and FIG. 16) to complete the channel letter. The composition or materials of the rib 120 and the face plate are then important for proper bonding as described below.

Figure 2:
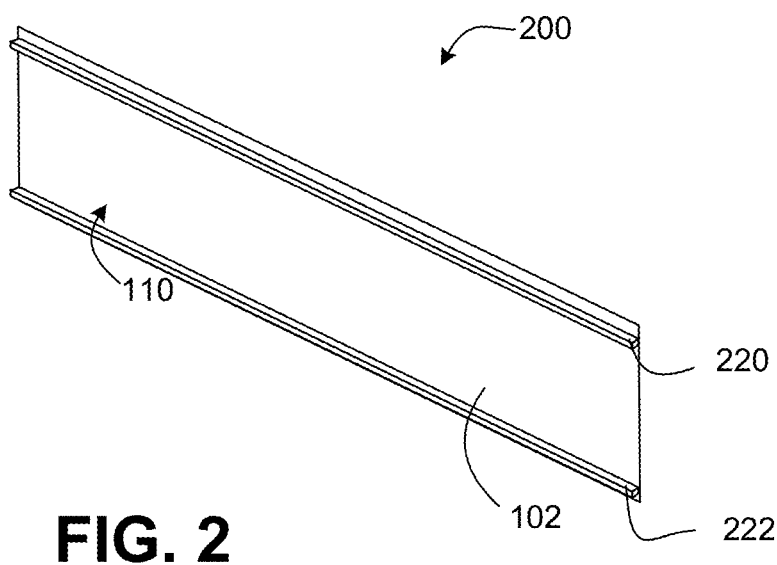
FIG. 2 is a perspective view of a profile having two ribs.

FIG. 2 is a perspective view of another embodiment of a profile. As shown, a profile 200 is similar to the profile 100, having the rule 102. The profile 200 can further have a rib 220 and a rib 222 adhered to the first surface 110. In some embodiments, the profile 200 can then be similar to the profile 100 with the additional rib 222. Similar to the rib 120 (FIG. 1), the rib 220 can provide a mounting point for a face plate (see FIG. 9). The second rib 222 can further provide a second mounting point for a back plate or bottom plate or other mounting options as described below.

Figure 3:
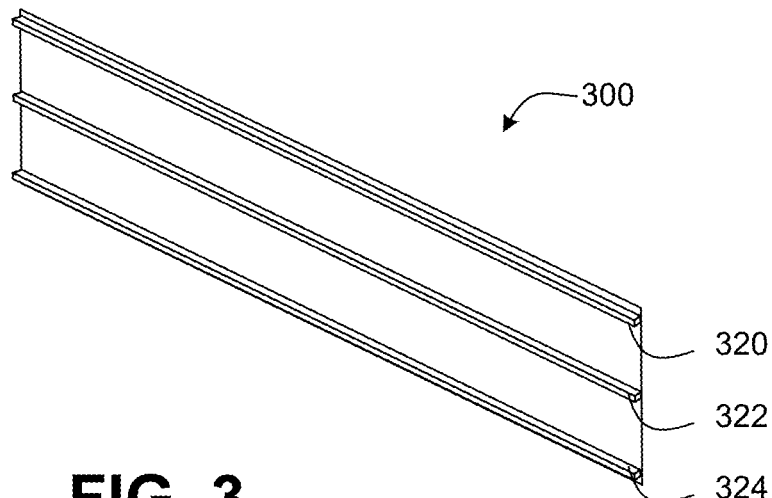
FIG. 3 is a perspective view of a profile having three ribs.

FIG. 3 is a perspective view of another embodiment of a profile. As shown, a profile 300 can have the rule 102, similar to the profile 100 and the profile 200. The profile 300 can have a rib 320, a rib 322, and a rib 324 for a total of three ribs in this embodiment. The various numbers of ribs can provide additional structural support and design options. A central plate (not shown) or a back plate (see FIG. 9) can be bonded to one or more of the ribs 322, 324 in order to install various electronics or lights.

Figure 4:
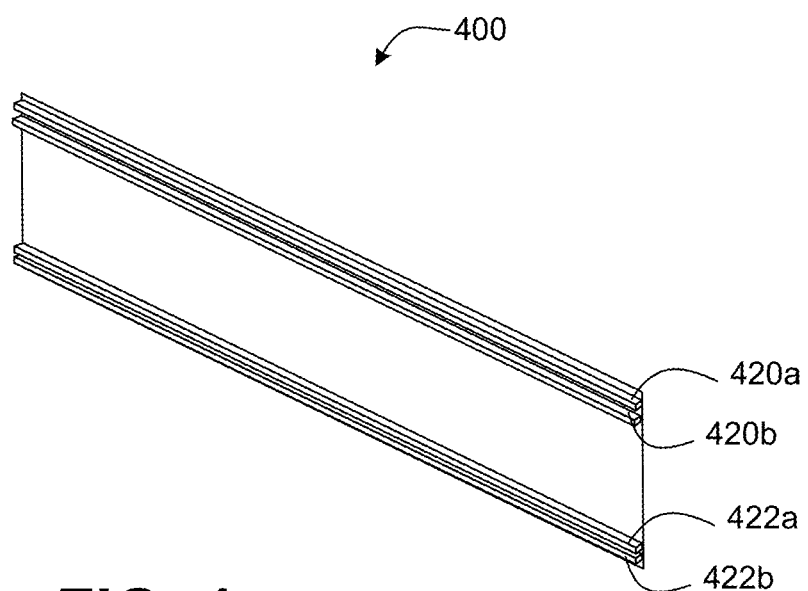
FIG. 4 is a perspective view of a profile having two pairs of ribs.

FIG. 4 is a perspective view of another embodiment of a profile. As shown, a profile 400 can have the rule 102, similar to above. The profile 400 can further have a first pair of ribs 420 and a second pair of ribs 422. The first pair of ribs 420 is shown as a rib 420a and a rib 420b, while the second pair of ribs 422 is shown as a rib 422a and a rib 422b. The profile 400 can have features and construction similar to the previously described profiles 100, 200, 300, wherein the first pair of ribs 420 and the second pair of ribs 422 are adhered to the rule 102 to form the profile 400.

Though FIG. 1-FIG. 4 were described separately, each of the embodiments were described to illustrate the variable number of ribs that may be utilized in the formation of channel letters as described herein. While certain aspects may be described in relation to a single profile, each of the profiles 100, 200, 300, 400, may be adapted for use in connection with the methods and other profile configurations described below.

Figure 5:
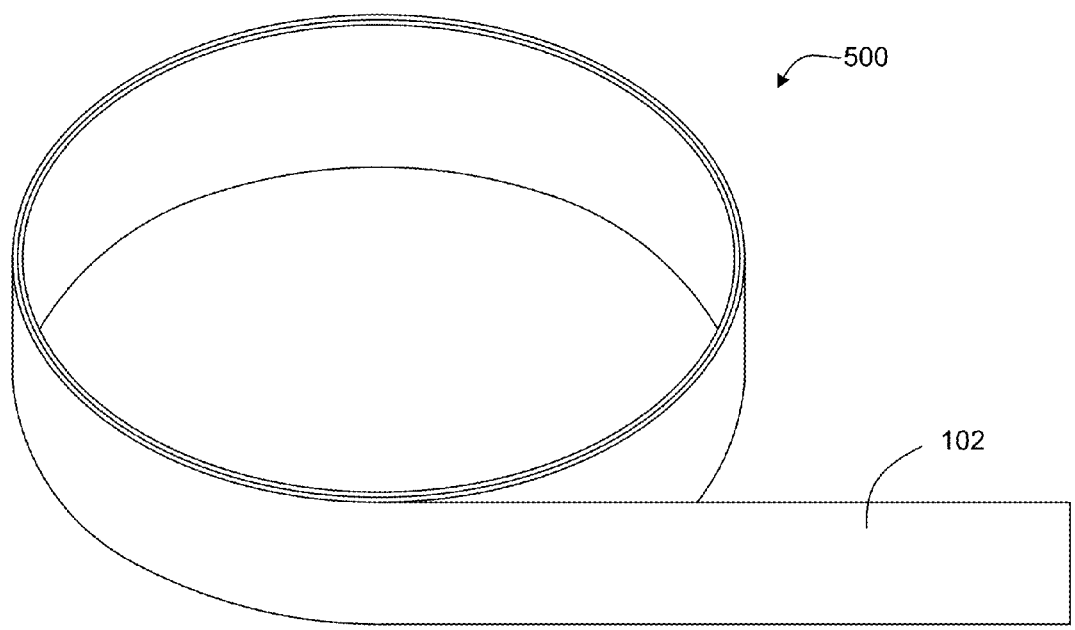
FIG. 5 is a perspective view of a roll of rule.

FIG. 5 is a perspective view of a roll of rule. The rule 102 (FIG. 1, for example) may be stored in large rolls such as a roll 500. The roll 500 can have several hundred meters of the rule 102 stored. Since the metallic material from which the rule 102 is formed is generally flexible, it is readily rolled and can be stored and transported accordingly.

Figure 6:
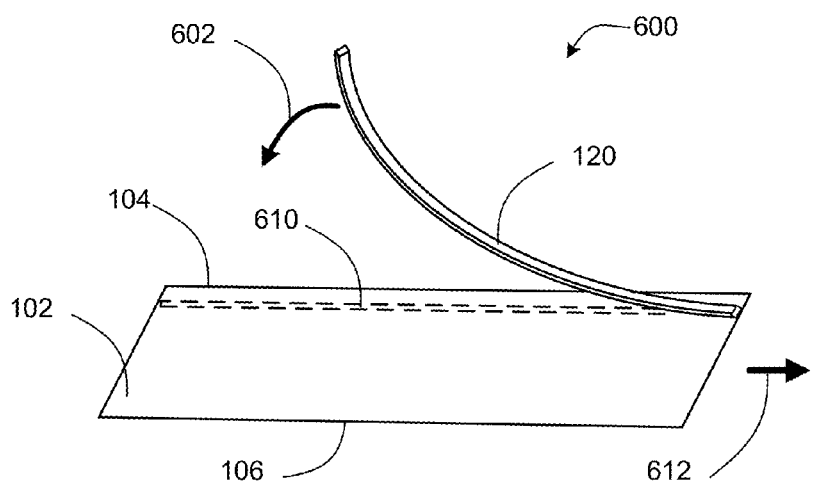
FIG. 6 is a perspective view of a rib as applied to a rule to form a profile.

FIG. 6 is a perspective view of a rib as applied to a rule to form a profile. As shown, the rib 120 can be applied to a section 600 of the rule 102. In some embodiments, the section 600 may be a portion of the rule 102 that is cut from or part of the roll 500. The rib 120 can be applied to the rule 102 in a direction indicated by an arrow 602. The rib 120 can be adhered to the rule 102 using a layer or layers of adhesive 610 (shown in dashed lines). In some embodiments, the rib 120 can be applied to the rule 102 in the section 600 as shown. In some other embodiments, long portions of the rib 120 can be applied to long sections 600 of the rule 102 that is unrolled from the roll 500 and/or cut to a desired length. In some embodiments, the resulting profile 100 can be rolled back up and stored or transported.

In some embodiments, the nature and composition of the materials used in forming the profile 100 can be significant. Various glues or bonding agents such as the adhesive 610 can be selected for their characteristics and ability to bond given materials (e.g., metal to plastic or plastic to plastic). In some embodiments, the adhesive 610 may be selected from those bonding agents specifically formulated for bonding two synthetic materials such as a variety of plastics, acrylic, elastomers, or other polymers as described herein. The rule 102 can be coated with an enamel coating that protects or provides a desired finish or color for the interior (e.g., the first surface 110) and exterior (e.g., the outside surface) of a completed channel letter. Accordingly, the adhesive 610 can be selected to provide or form an optimum bond between, for example, the rule 102 having an enamel coating and a plastic rib 120. The plastic rib 120 can then be easily bonded to an acrylic face plate (see FIG. 9) or other similar material. The adhesive 610 for bonding similar substrates, such as plastics, may be more readily available, less expensive, and provide more resilient and permanent bonds. Thus such an adhesive may provide certain benefits over those for bonding, for example, a plastic rib 120 to an unfinished metal rule 102. In some embodiments, the adhesive 610 optimized for bonding metal to plastic can further be more expensive or more difficult to obtain than the adhesive 610 formulated to permanently bond two synthetic materials such as plastics and other polymers as described herein.

In some embodiments, certain bonding agents for bonding plastics and various other synthetic materials to themselves can create molecular bonds between adjacent surfaces. Such bonding agents as certain glues, one-part or two-part epoxy formulations, and certain solvent type agents, can weld a plastic or an acrylic rib 120 to the enamel coating of the rule 102. Such bonding agents may be less expensive than those that can provide an equally effective bond between a metal (e.g., an unfinished metal rule 102) and the (plastic) rib 120. Such bonding agents may not be readily available or cost effective for large scale use as the adhesive 610. Similar bonding agents may be used for bonding a face plate (see FIG. 9) to the rib 120 and the rule 102.

Figure 7:
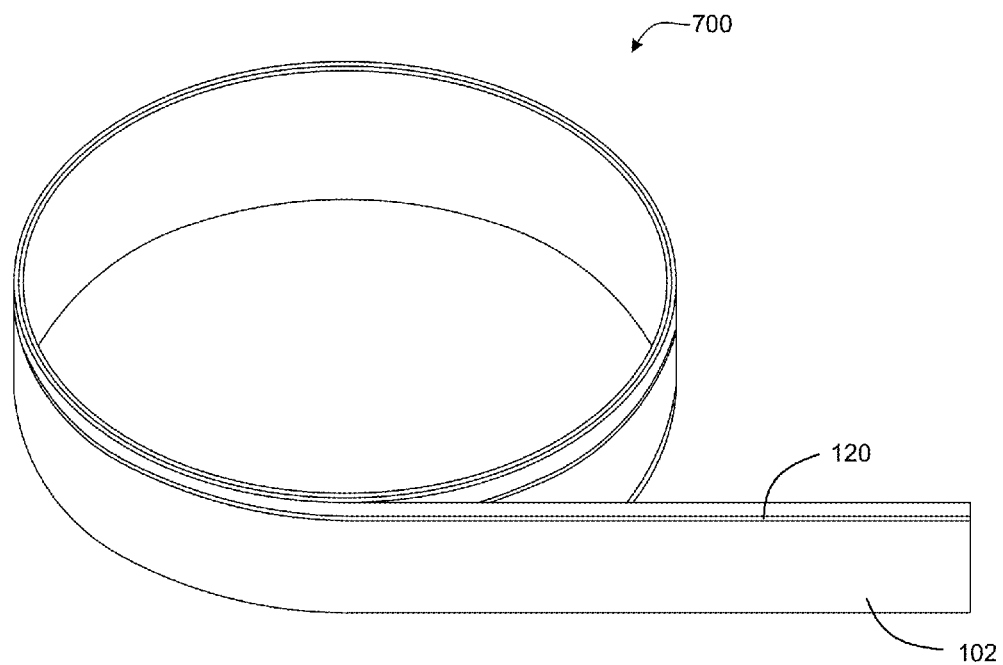
FIG. 7 is a perspective view of a roll of profile.

FIG. 7 is a perspective view of a roll of profile. A roll of profile 700 can be formed as the rib 120 is applied to the rule 102. In some embodiments, the roll 500 can be unrolled in a specially configured machine (not shown) that can apply the layer of adhesive 610 to which the rib 120 is then applied. Such a machine can be configured to unroll the roll 500, apply the adhesive 610, apply the rib 120, and roll the completed profile 100 into the roll of profile 700. The roll of profile 700 can be stored and later used for the production of channel letters using the profile 100. The roll of profile 700 can have one or more ribs 120, similar to the previously described profiles, for example, the profiles 100, 200, 300, 400.

Figure 8:
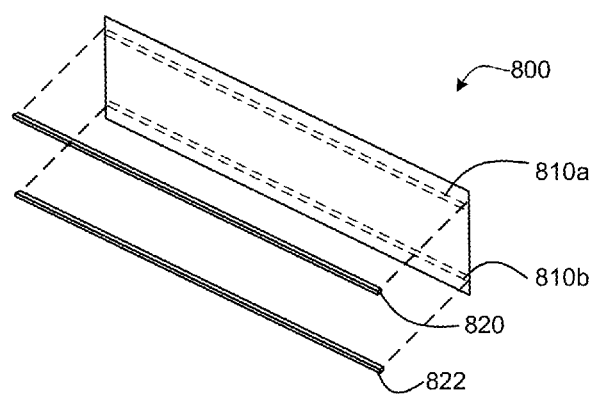
FIG. 8 is a perspective view of a profile being formed with two rib.

FIG. 8 is a perspective view of a profile being formed with two ribs. A profile 800 is shown as a rib 820 and a rib 822 are being applied to the rule 102. The rib 820 and the rib 822 can be similar to the previously disclosed ribs in the preceding figures, for example the rib 220 and the rib 222 (FIG. 2). Each of the rib 820 and the rib 822 can be secured to the rule 102 through the use of an adhesive 810. The adhesive 810 is shown as adhesive 810a and adhesive 810b corresponding to the rib 820 and the rib 822. The adhesive 810 can be similar to the adhesive 610.

Figure 9:
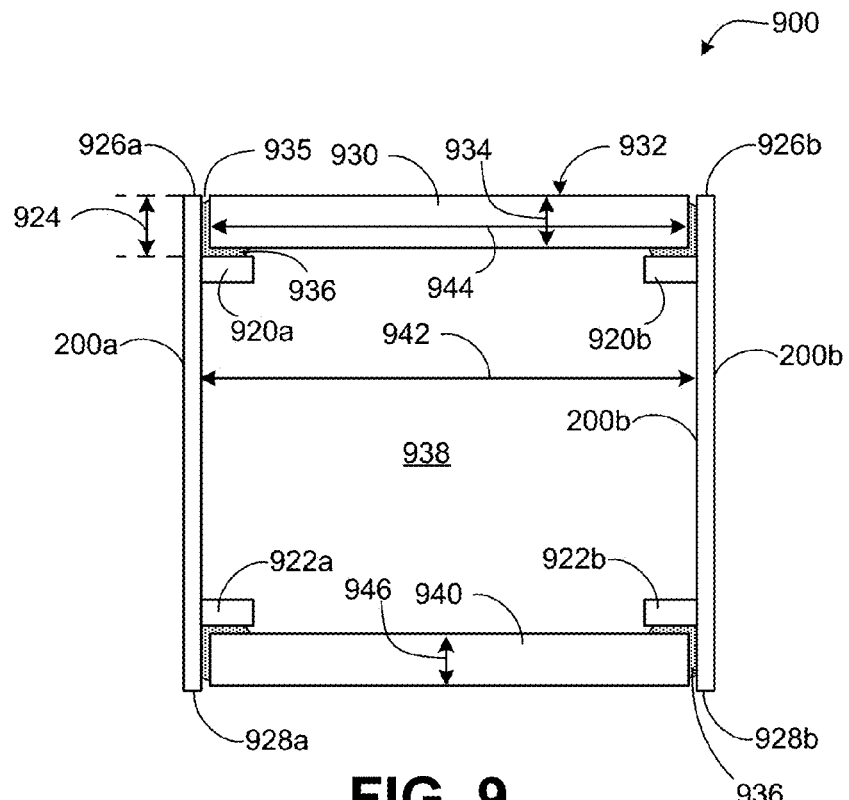
FIG. 9 is a sectional view of a portion of an exemplary channel letter.

FIG. 9 is a sectional view of a portion of an exemplary channel letter. A portion of a channel letter 900 is shown using the profile 200 of FIG. 2. The section is taken along a line 9-9 of FIG. 16, described below. As shown, a profile 200a and a profile 200b are used in the formation of the channel letter 900. In some embodiments, any of the other previously described profiles 100, 300, 400 can be used in a similar manner to form the channel letter 900.

In some embodiments, the portion of the channel letter 900 shown can be formed of a single length of the profile 200. Therefore in some embodiments, the profile 200a and the profile 200b can be two portions of the same length of bended profile. The profile 200a and the profile 200b may be referred to collectively as the profiles 200.

The profile 200a can have a top rib 920a and a bottom rib 922a. Similarly, the profile 200b can have a top rib 920b and a bottom rib 922b. The top rib 920a and the top rib 920b (collectively referred to as "top ribs 920") can be similar to, for example, the rib 120, the rib 220, or the other ribs described in connection with the preceding figures. The ribs 920a, 920b and the ribs 922a, 922b are distinguished for purposes of description.

The top ribs 920 can be located a distance 924 from a top edges 926 of the profiles 200. The top edges 926 can be similar to the top edge 104 of FIG. 1. In an embodiment, the distance 924 provides sufficient space to receive a face plate 930 such that a top surface 932 of the face plate 930 is flush with the top edge 926 of the profile 200a when the channel letter 900 is completed. Accordingly, the face plate 930 can have a face plate thickness 934 that is slightly smaller than the distance 924, such that there is a gap 935 between the adjacent portions of the rib 920, the rule 102 and the face plate 930.

In some embodiments, the profile 200a and the profile 200b can be separated by a distance 942. The distance 942 can be slightly larger than a face plate width 944. Accordingly, the profiles 200 may be spaced apart such that the channel letter 900 can receive the face plate 930 with a clearance fit. The gap 935 may therefore be formed or otherwise configured to receive an adhesive 936, for example, a bonding agent similar to the adhesive 610. In some embodiments, the adhesive 936 used for bonding the face plate 930 to the rib 920 and the rule 102 may be an adhesive specifically designed for bonding plastics or other polymers. The adhesive 936 may further create a permanent bond or weld between the face plate 930 and the ribs 920.

Figure 15:
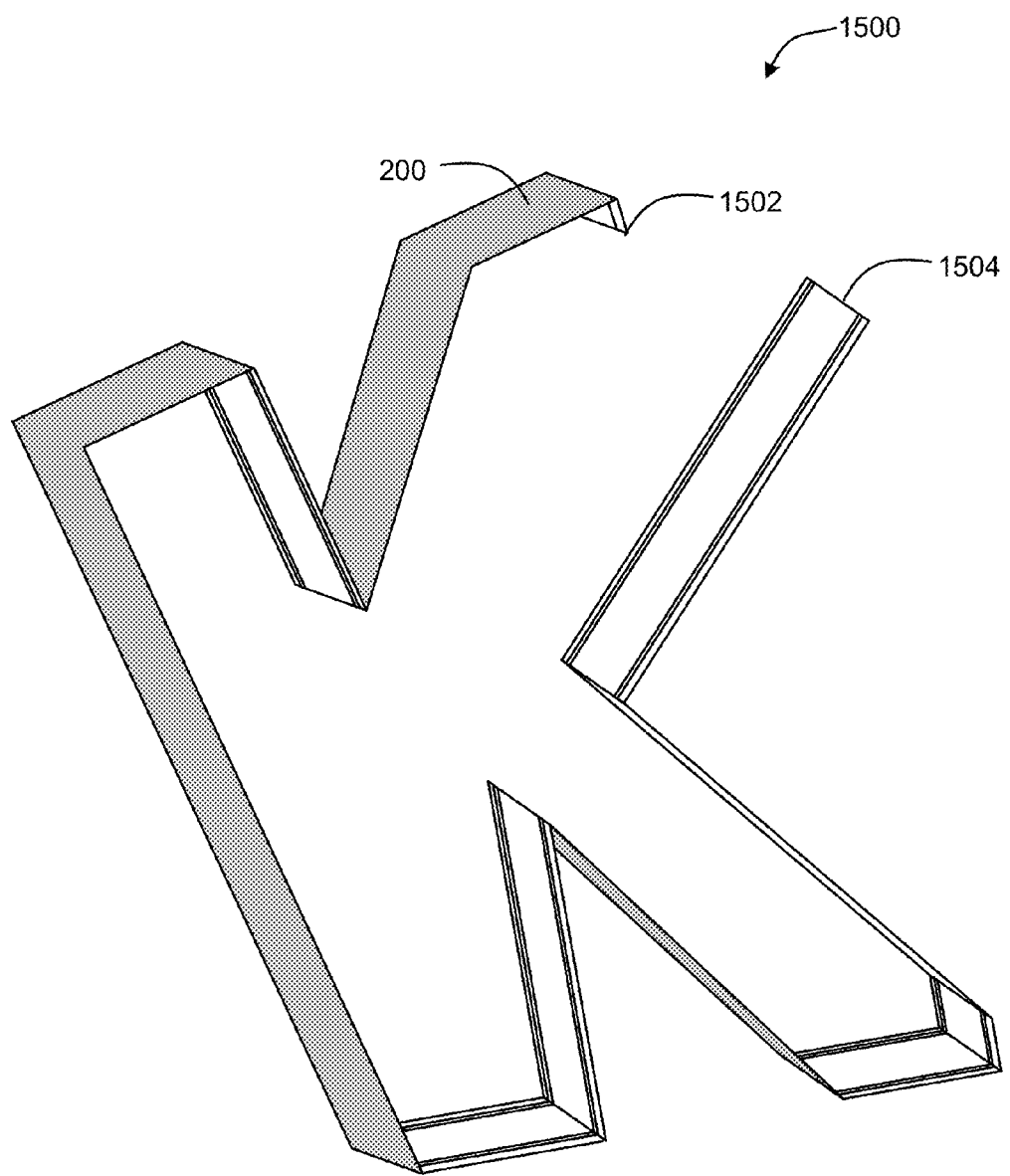
FIG. 15 is a perspective of a channel letter formed from a profile.
Figure 16:
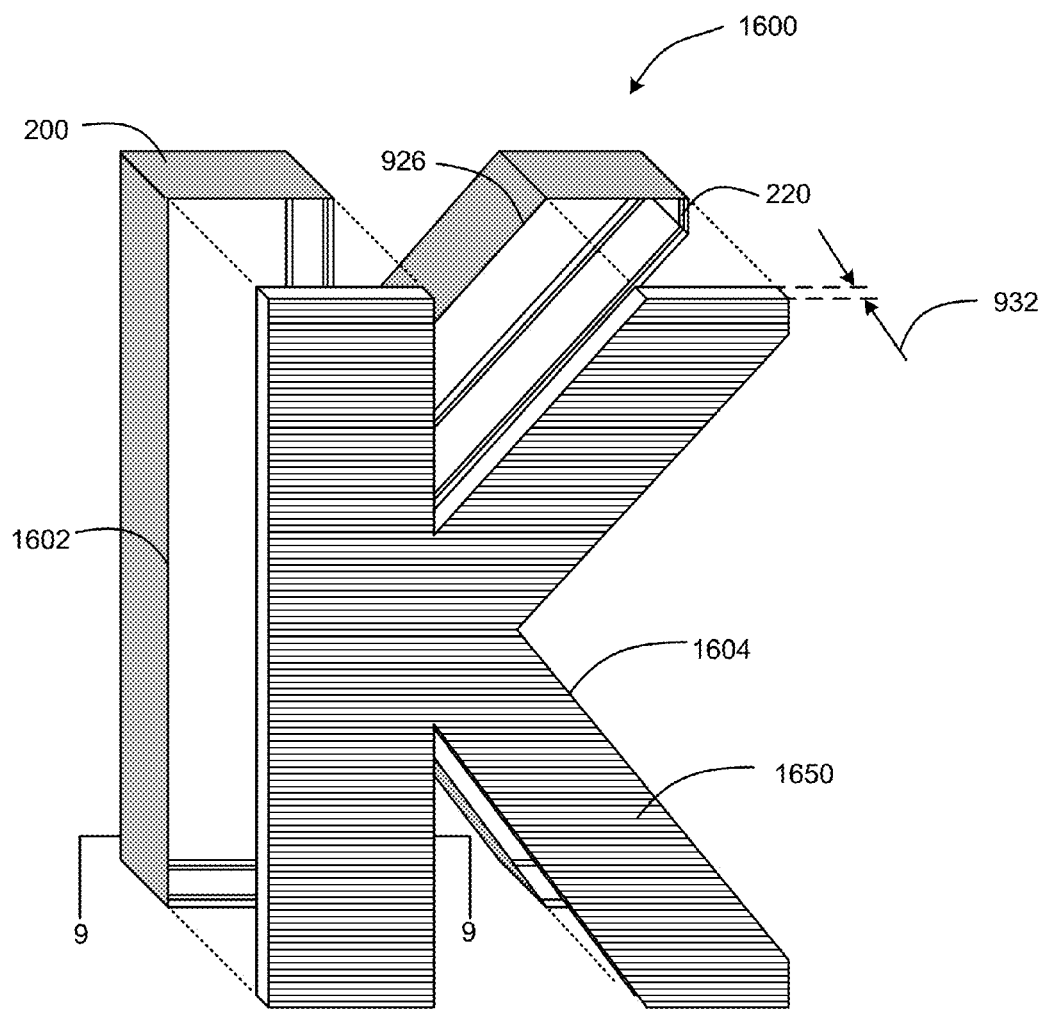
FIG. 16 is a perspective view of the completed channel letter of FIG. 15 fitted with a face plate.

In some embodiments, the face plate 930 can be formed of a certain plastic or other polymer and may form the outline of a particular letter (e.g., a "k") or other possible form (see FIG. 15, FIG. 16). In some embodiments, the face plate 930 can have a translucent or transparent structure formed from certain acrylics or other plastics, thereby allowing light to pass through the face plate 930.

In certain embodiments, the top surface 932 of the face plate 930 is flush with the top edges 926 of the profile 200a and the profile 200b in the completed channel letter 900. This may provide certain aesthetic advantages because there is no further bending or forming required of the face plate 930 to flange or wrap it over the top edges 926. The face plate 930 may be cast, molded, or formed to the specific interior dimensions (e.g., the face plate width 944 slightly smaller than the distance 942) of the completed channel letter 900 and secured in place with the adhesive 936. In some embodiments, the adhesive 936 may form a water tight seal between the face plate 930 and the profiles 200, thereby protecting the contents of the channel letter 900, such as one or more lights or certain electronics. Accordingly, the channel letter 900 may further have a central space 938 sized to accommodate one or more lights that can project through the face plate 930.

The profile 200b and its components can be arranged in a similar manner as the profile 200a. Certain reference numerals are not repeated for the rib 220b for brevity.

In certain embodiments, the channel letter 900 may further have a bottom plate 940. The bottom plate 940 may be similar to the face plate 930 and be formed to fit between the profiles 200 in a similar manner to the face plate 930. The bottom plate can further have similar dimensions as the face plate 930. For example, the bottom plate 940 can have a bottom plate thickness 946. The bottom plate thickness 946 can be similar to the face plate thickness 934. Accordingly, the bottom plate 940 can be fit between and be secured to a rib 922*a* and a rib 922*b* near bottom edges 928*a*, 928*b* (collectively referred to as bottom edges 928) of the profiles 200. Thus the bottom plate 940 may be secured in place between the profiles 200 by the adhesive 936, similar to that described above. The bottom plate 940 can further be secured to a wall or other mounting surface in certain implementations. The bottom plate 940 can further be flush with the bottom edges 928 in the channel letter 900 when bonded in place. In another embodiment, the bottom plate 940 can be formed of a translucent or transparent material, such as for example, acrylic. In still another embodiment, the bottom plate 940 can be a portion of a larger structure formed to support a series of channel letters 900.

Figure 10:
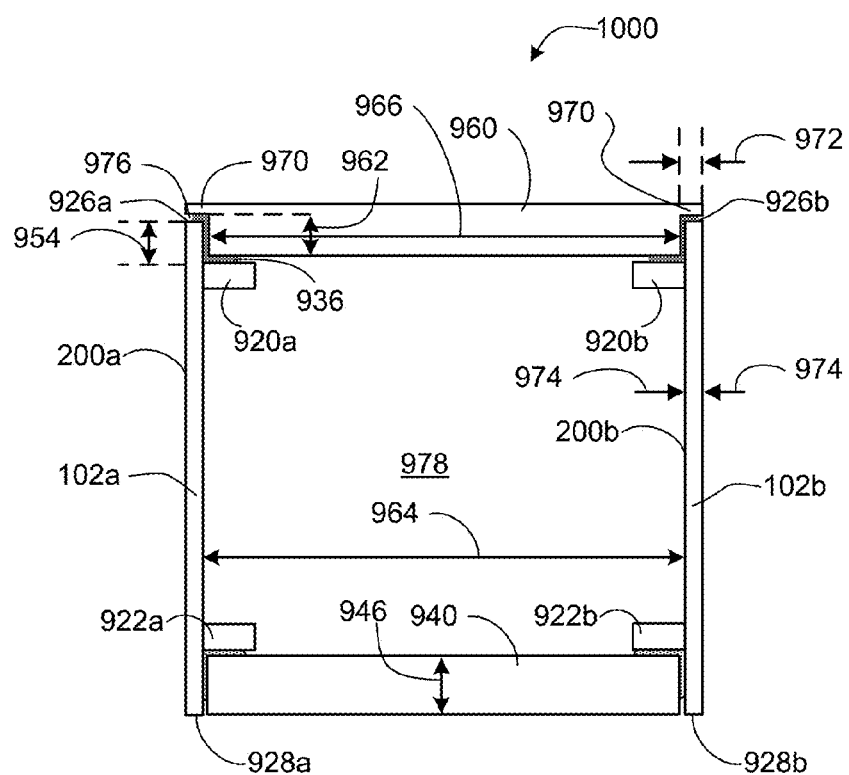
FIG. 10 is a sectional view of a portion of another an exemplary channel letter.

FIG. 10 is a sectional view of a portion of another exemplary channel letter. A portion of a channel letter 1000 is shown, having the profiles 200, similar to the channel letter 900 described above. The portion of the channel letter 1000 shown can be another embodiment taken along the line 9-9 of FIG. 16. The profiles 200 may be formed from a single section of profile 200 that is bent or folded back on itself to form the channel letter 1000.

In certain embodiments, the channel letter 1000 can have the ribs 920 and the ribs 922 that are spaced in a similar fashion as in the channel letter 900. The ribs 920 can be separated from the top edge 926*a* and a top edge 926*b* by a distance 954. The distance 954 may be similar to the distance 924 (FIG. 9). The profile 200*a* (e.g., the rule 102*a* and the rib 920*a*) and the profile 200*b* (e.g., the rule 102*b* and the rib 920*b*) can be spaced apart by a distance 964.

The channel letter 1000 can also have a face plate 960. The face plate 960 can further have a face plate width 966 that is slightly smaller than the distance 964 to receive the face plate 960 in a clearance fit, similar to FIG. 9. The face plate 960 can also have a face plate thickness 962 slightly smaller than the distance 954.

The face plate 960 can also have a lip 970. The lip 970 can be formed about a perimeter of the face plate 960. In some embodiments, the lip 970 can be sized to overlap the top edges 926 of the profiles 200 such that it covers the top edges 926 of the profiles 200. The lip 970 can have a lip depth indicated by the arrows 972 (referred to herein after as lip depth 972). The lip depth 972 can be slightly larger than a profile thickness, indicated by the arrows 974 (hereinafter profile thickness 974). The profiles 200 can thus be spaced apart to receive the face plate 960 with a clearance fit. The clearance fit may leave a small gap 976 into which the adhesive 936 may be added. The adhesive 936 may be added prior to installing the face plate 960 to the folded profiles 200.

In some embodiments, the lip 970 in conjunction with the adhesive 936 and the top edge 926 may further serve to create a sealed space 978 beneath the face plate 960. Similar to the face plate 930, the face plate 960 can be translucent or transparent so as to allow light to penetrate the face plate 960.

In some other embodiments, the channel letter 1000 can further have the bottom plate 940 as shown in FIG. 9. In another embodiment, the bottom plate 940 can be formed similar to the face plate 960. Such an embodiment may resemble the channel letter 900 with the lip 970 covering the bottom edges 928.

Figure 11:
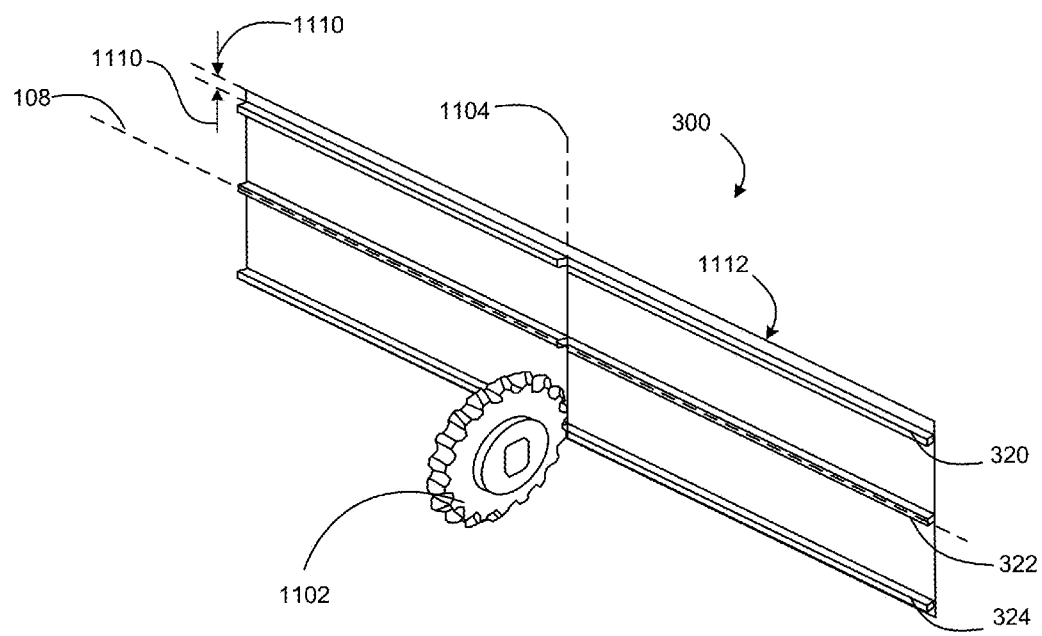
FIG. 11 is a perspective view of a cutting unit engaged with a profile.

FIG. 11 is a perspective view of a cutting unit engaged with a profile. A cutting unit 1102 is shown engaged with the profile 300 to make a cut in each of the ribs 320, 322, 324. While the profile 300 is shown in this figure, any of the profiles described herein can be used (cut) in such a manner. In some embodiments, the cutting unit 1102 can be a portion of a larger machine that can supply, cut, and fold the profile 300 into a desired channel letter (e.g., the channel letters 900, 1000).

The ribs 320, 322, 324 can provide a degree of structural support and rigidity to the profile 300. Due to the orientation of the ribs 320, 322, 324 along the profile axis (e.g., the profile axis 108 of FIG. 1) and the additional thickness of the ribs 320, 322, 324, accurate folding of the profile 300 in a direction orthogonal to the profile axis 108 can be impeded. Thus certain types and numbers of cuts to the ribs 320, 322, 324 may facilitate bending the profile 300 in a variety of bends or curves to create the desired channel letter (e.g., the channel letter 900, 1000).

The rib 320 can also be separated from a top edge 1112 of the profile 300 by a distance indicated by arrows 1110 (hereinafter, "distance 1110"). The distance 1110 can be similar to the distance 924 (FIG. 9) and sized to receive and accommodate the face plate 930 or the face plate 960. The adhesive 936 can then be employed to secure the face plate 930 or the face plate 960 in place.

Figure 12:
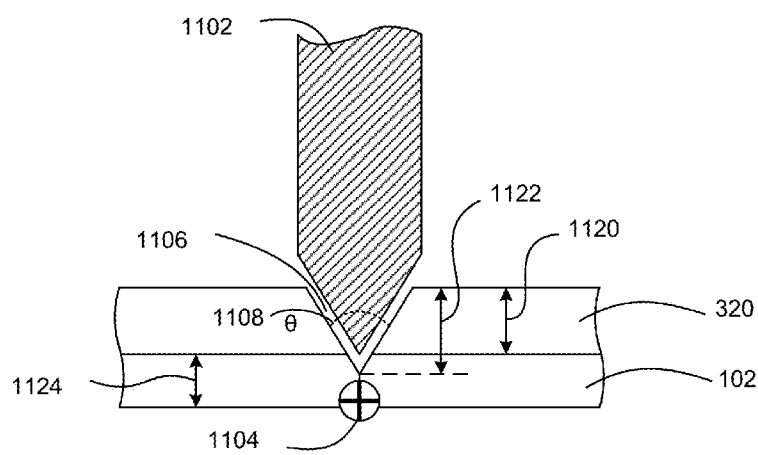
FIG. 12 is a sectional view of the cutting unit engaged with a profile.

As shown, the cutting unit 1102 is engaged with the profile 300 at a position indicated by a line 1104 (indicated by a dashed line). In some embodiments, the cutting unit 1102 can be a saw, that rotates (cuts) in a direction substantially transverse to the profile axis 108. The line 1104 extends orthogonal to the profile axis 108 and through each of the ribs 320, 322, 324. The cutting unit 1102 may then be moved into position to create a cut 1106 (see FIG. 12) along the line 1104. The cut 1106 removes a portion of each of the ribs 320, 322, 324. In some embodiments, the cutting unit 1102 can further score the rule 102 (FIG. 12). In an embodiment, the cutting unit 1102 penetrates the ribs 320, 322, 324 and scores the rule 102, but does not cut completely through the profile 300 (or the rule 102).

In some embodiments, the cut 1106 is a triangular cut or a v-shaped cut. The cut can be oriented with the narrow end of the V-shape toward the rule 102. The open end of the cut 1106 is then oriented away from the rule 102, toward the cutting unit 1102. Additionally, the triangular shape can be defined by a size and shape of the cutting unit 1102. The size and shape of the cut 1106 can also dictate an angle through which the profile 300 can be bent following the cut 1106.

FIG. 12 is a sectional view of the cutting unit engaged with a profile. The cutting unit 1102 is shown cutting the rib 320 of the profile 300, similar to FIG. 11 above. As noted previously, any of the foregoing profiles 100, 200, 300, 400 can be implemented in such a way.

As shown, the rib 320 has a v-shaped portion cut away or removed by the cutting unit 1102. The v-shaped cut 1106 is centered at the line 1104. The line 1104 is depicted as a crosshairs indicating the line 1104 extends out of the page.

Each of the ribs 320, 322, 324 can have a rib height 1120. The rib height 1120 can be from one (1) mm to in excess of three (3) mm of additional thickness to the rule. The rib height 1120 of the individual ribs 320, 322, 324 may be different from one another. The rule 102 can further have a thickness 1124. The rule thickness 1124 of 0.2 to 1.5 millimeters (mm), for example the thickness 974 of FIG. 10.

In some embodiments, the depth of the cut 1106 can extend through the rib 320 to a cut depth 1122, thus scoring the rule 102. In some other embodiments, the cut depth 1122 may be equal to the rib height 1120. This flexibility may provide certain options for folding the profile 300. As shown, the cut 1106 has an angle 1108 (shown in dashed lines and represented by the Greek letter, θ). The angle 1108 can be related to the shape of the cutting unit 1102. As a non-limiting example, the angle 1108 can be approximately 80 degrees.

Accordingly, the profile can be bent or folded at the line 1104 through the angle 1108 (80 degrees) without interference from the rib 320. In such an embodiment, the resulting profile can be folded 80 degrees to achieve a 260 corner in the profile 300. Additional cuts 1106 may be repeated on either side of the line 1104 to create more aggressive bends or curves. This is described in connection with FIG. 17, below. The angle 1108 can be determined or selected based on a profile of the cutting unit 1102. Different angles 1108 can generate different types of bends in the finished channel letter 900, 1000. In another embodiment, the cut 1106 may be another shape, such as a round or rectangular cut, depending on the type and style of cutting unit implemented and the types and angles desired.

Figure 13:
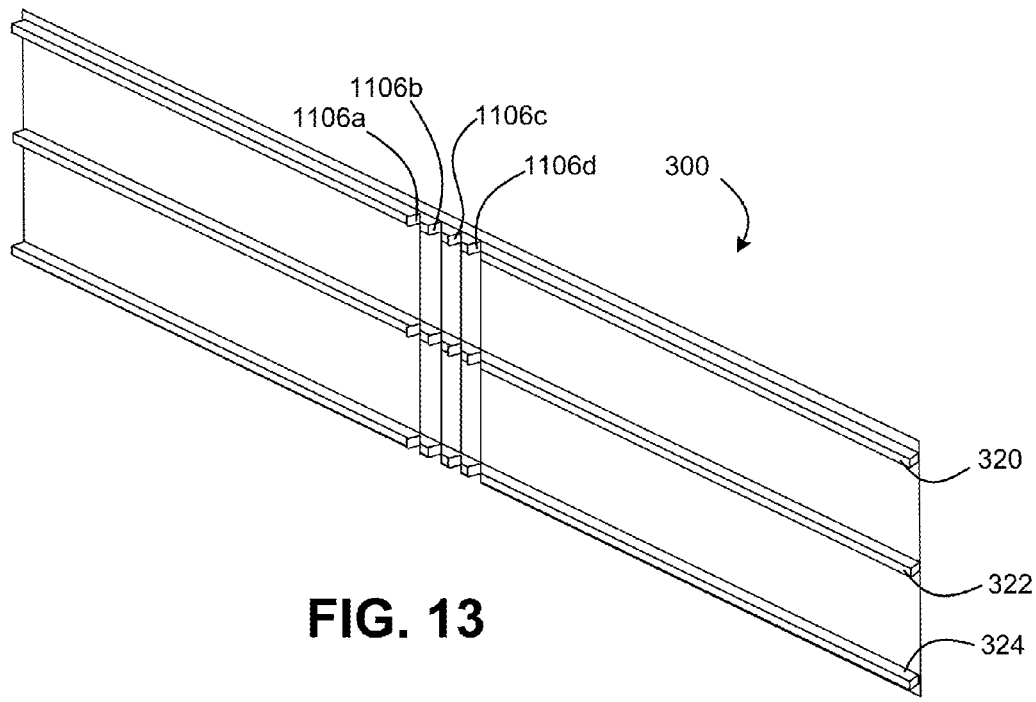
FIG. 13 is a perspective view of a portion of a profile with multiple cuts.

FIG. 13 is a perspective view of a portion of a profile with multiple cuts. The profile 300 is shown with four cuts 1106a-1106d. The multiple adjacent cuts 1106a-1106d can be used to form a curved portion of a channel letter. For example, the letter "P" may be formed in a channel letter. The letter "P" has two 180 degree curves (inside curve and an outside curve) that may be formed using the multiple cuts 1106a-1106b.

Figure 14:
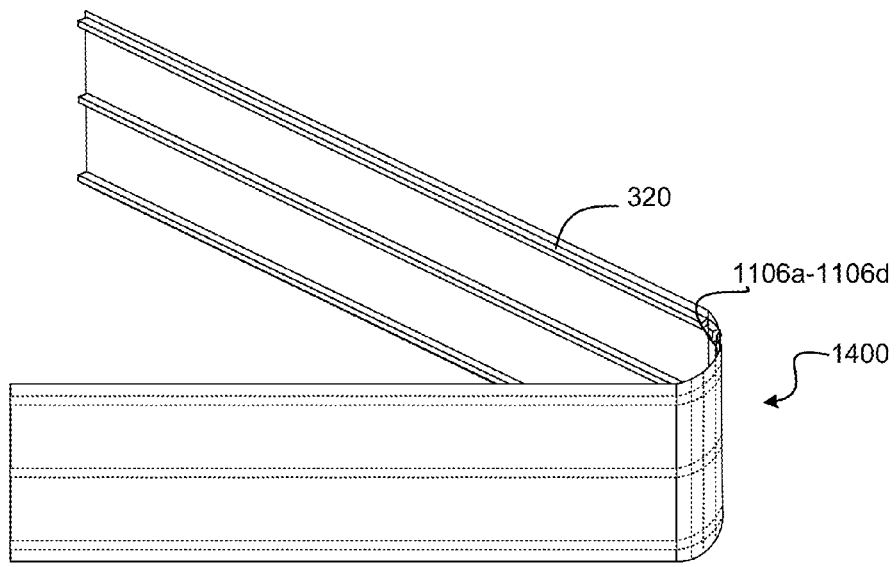
FIG. 14 is a perspective view of the profile of FIG. 13 folded about multiple cuts.

FIG. 14 is a perspective view of the profile of FIG. 13 folded about multiple cuts. With multiple cuts 1106a-1106d as shown in FIG. 13, the profile 300 can be bent to form a curve 1400 as shown. The single cut 1106 (FIG. 12) may only allow a single bend at the line 1104 for a maximum of the angle 1108, possibly resulting in a hard angle (as opposed to a curve), for example in a letter "K" or the bottom of the letter "P." In some embodiments, the rib 320 may be displaced from the top edge 1112 by the distance 1110 as described above. The rib 320 having the cuts 1106a-1106d that forms the curve 1400 can then also support the face plate 930 or the face plate 960. Accordingly, the face plate 930 or the face plate 960 can have a perimeter matching the curve 1400.

FIG. 15 is a perspective view of a channel letter formed from a profile. An incomplete channel letter 1500 resembles an incomplete letter "K", open at the top. The letter "K", for example, can be made from the profile 200 (FIG. 2). The incomplete channel letter 1500 can also be formed from the other profiles, such as the profile 100, the profile 300, and the profile 400, or other types of profiles. The use of the letter "K" is merely for an example, and should not be considered limiting. Any letter, number, symbol, or form can be bent or folded. The incomplete channel letter 1500 is open at the top, where a first end 1502 can be secured to a second end 1504 to complete the incomplete channel letter 1500. The first end 1502 can be secured to the second end 1504 by the use of an adhesive similar to the adhesive 936 or the adhesive 610. Such adhesives 610, 936 can be specially formulated for use with composites, enamel coatings, or other synthetic materials or such as plastic, acrylic, or other polymers. Due to the metal construction of the rule 102, metal welding the first end 1502 to the second end 1504 may be a further option to close the top of the letter "K."

FIG. 16 is a perspective view of the completed channel letter of FIG. 15 fitted with a face plate. In an embodiment, the first end 1502 and the second end 1504 are secured together to form a channel letter 1600. The channel letter 1600 can then be fitted with a face plate 1650. The face plate 1650 can be similar to the face plate 930 or the face plate 960. The channel letter 1600 has channel perimeter 1602 described by the top edge 926 of the profile 200 used to generate the channel letter 1600. The face plate 1650 can have a face perimeter 1604 that can be the same or slightly smaller than the channel perimeter 1602. The face plate 1650 can then be inserted into the channel letter 1600 and contained within the channel perimeter 1602 in a clearance fit.

The face plate 1650 can have the face plate thickness 934 (FIG. 9) that is sized to fit between the top rib 220 and the top edge 926 (FIG. 9). The top rib 220 can also be similar to the top rib 920a or the top rib 920b of FIG. 9. The face plate 1650 can be formed to fit within the channel letter 1600 and secured in place using the adhesive 936, as described above. In some embodiments, the face plate 1650 can fit flush with the top edge 926. In some other embodiments, the face plate 1650 can be formed with the lip 970 as in FIG. 10 to provide a finished look, covering the top edges 926. As noted previously in connection with FIG. 9, the use of the profile 200 is exemplary. The channel letter 1600 can be formed using other embodiments of the profile 100, 200, 300, 400 having at least one rib, e.g., the rib 120, the rib 220, the rib 320, or the ribs 420. Different numbers of ribs 120 can be selected based on design preference or application.

Figure 17:
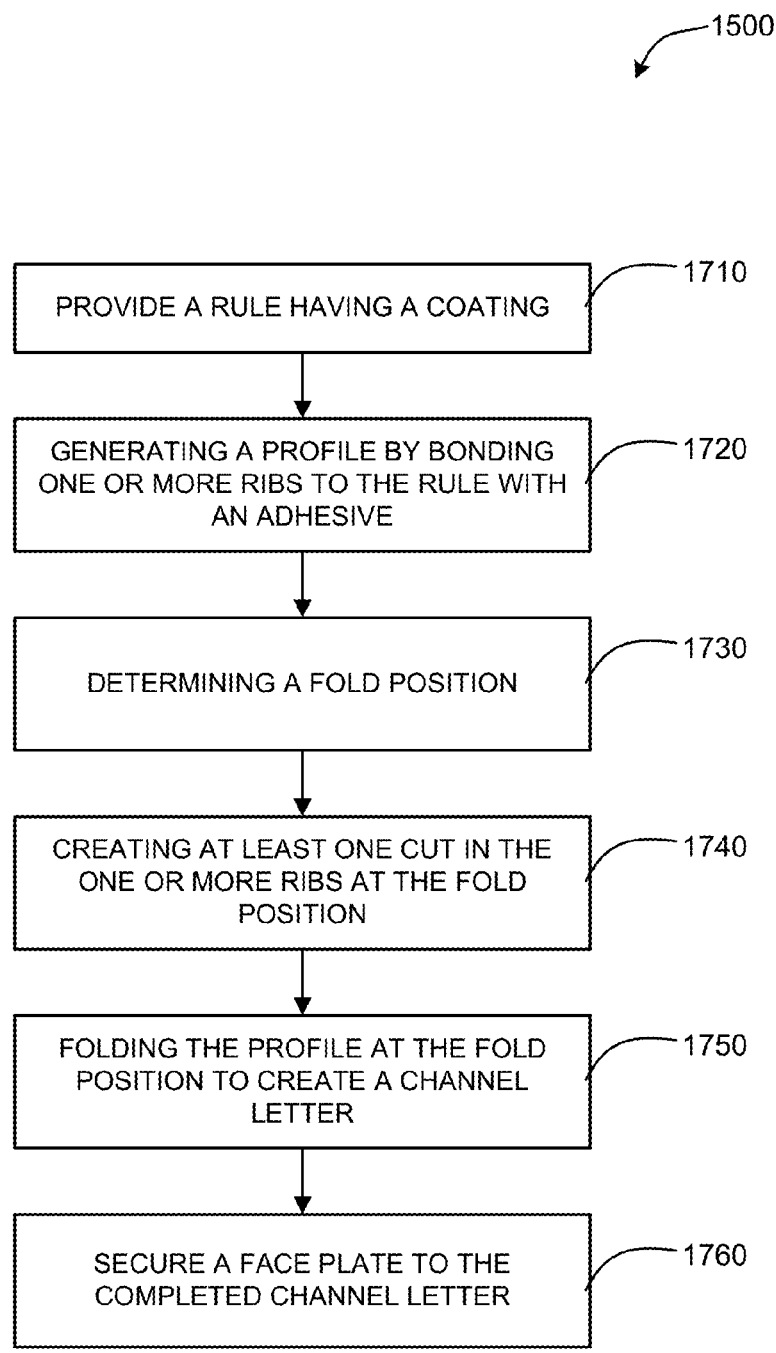
FIG. 17 is a flowchart of a method for making profiles and a channel letter from the profile.

FIG. 17 is a flowchart of a method for making profiles and a channel letter from the profile. A method 1700 can be used for making profiles for generating channel letters (e.g., the channel letter 1600). At block 1710, the method 1700 can provide the rule 102. The rule 102 can be provided in large rolls (e.g., the roll 500). The roll 500 can have many meters of the rule 102. In another embodiment, the rule 102 can be provided in sections. The rule 102 can further have a protective coating of enamel or other comparable coating as described above. Such a coating may be advantageous when using adhesives (e.g., the adhesive 610) to secure certain plastic materials. Such adhesives may be less expensive than other bonding agents used for securing plastic to metal, for example.

At block 1720, the coated rule 102 can then be fitted with one or more ribs 120 to generate the profile 100. The roll 500 can be unrolled and the rule 102 can be mechanically or manually fitted with a rib 120 to make the profile 100. The rib 120 can be secured to the rule 102 using the adhesive 610. The rule 102 can be fitted with the rib 220 and the rib 222 to make the profile 200. The rule 102 can further be fit with three ribs 320, 322, 324 to produce the profile 300. This process may be completed manually or automatically by a machine formed to adhere the desired number of the ribs 120 to the rule 102 to complete the profile 100, or for example the profiles 200, 300, 400. In an embodiment, the method 1700 can end at block 1720 and the generated profile can be re-rolled for additional storage as the roll of profile 700 (FIG. 7). The roll of profile 700 can then be stored, transported, or fed into a machine for making channel letters. The profile 100 can then be cut and folded as described herein.

At block 1730, a fold position can be determined. The fold position can be used to determine where one or more cuts should be made. If the channel letter requires a hard angle fold, such as for example, an acute angle or a right angle, only a single cut 1106 may be required. If a curve such as the curve 1400 (FIG. 14) is required, such as in the letter "O" or the letter "P," multiple successive cuts (e.g., the cuts 1106a-1106d) may be required.

At block 1740, at least one cut can be created at the determined fold position. The cuts 1106 can penetrate the ribs 120, 220 in order to remove a portion of the ribs 120, 220 in order to facilitate a fold or the curve 1400. In some embodiments, the cuts 1106 can score the rule 102 but not cut through the entire profile 100, 200, 300, 400.

At block 1750, the profile 200 can be folded to create the angle or curve 1400 of the channel letter 900, 1000, 1500. Different channel letters or forms may require different numbers and types of curves or folds. The channel letter can be completed by securing the incomplete ends (e.g., the first end 1502 and the second end 1504) together with a suitable adhesive, bond, or weld.

At block 1760, the completed channel letter 1600 can resemble the outline of the desired letter, for example the letter "K" in FIG. 16. The channel letter can have a perimeter slightly larger than the face plate 1650 such that the face plate 1650 is received with a clearance fit, supported by the ribs 220 and contained by the rule 102. In some embodiments, the face plate 1650 can be flush with the top edges 926 (FIG. 9). In some other embodiments, the face plate 1650 can have the lip 970 such that the lip 970 covers the top edges 926.

What is claimed is:

1. A method of forming a profile for making a channel letter comprising:
    providing a face plate having a thickness;
    selecting a first location on a rule for bonding a first rib, the rule having a profile axis, a top edge, a bottom edge, a first surface, and a protective coating, the top edge and the bottom edge being separated by a profile height, wherein the first location is parallel to the profile axis on the first surface and is spaced a distance from the top edge that is substantially the same in length to the thickness of the face late, the first rib being formed from polymer;
    applying an adhesive to the first location on the first surface; and
    applying the first rib to the adhesive at the first location, the adhesive making a permanent bond between the first rib and the rule, and
    supporting the face plate with the first rib such that the face plate is flush with the top edge, or
    supporting the face plate with the first rib such that a lip of the face plate covers the top edge.

2. The method of claim 1 further comprising:
    selecting a second location for bonding a second rib, the second location being parallel to the first location and located between the first location and the bottom edge on the first surface;
    applying an adhesive to the second location; and
    applying the second rib to the adhesive at the second location, the adhesive making a permanent bond between the second rib and the rule.

3. A profile for making a channel letter, comprising:
    a rule having a top edge, a bottom edge, a first surface, and a protective coating, the top edge and the bottom edge being separated by a profile height and the first surface, defining an interior surface of a completed channel letter; and
    at least one rib bonded to the first surface with an adhesive, a first rib of the at least one rib being disposed parallel to a profile axis and separated from the top edge by a first distance that is substantially the same in length to a thickness of a face plate, the at least one rib further configured to receive one or more cuts, the cuts allowing the profile to bend and form the channel letter,
    wherein the first rib supports the face plate and is positioned such that the face plate is flush with the top edge in the channel letter, or the face plate has a lip that covers the top edge of the rule in the channel letter.

4. The profile of claim 3, further comprising a second rib of the at least one rib bonded to the first surface of the rule, the second rib disposed parallel to the profile axis and between the first rib and the bottom edge on the first surface.

5. The profile of claim 4, wherein the second rib is spaced a second distance from the bottom edge of the first surface, wherein the second distance is substantially the same in length to a thickness of a bottom plate.

6. The profile of claim 3, wherein the first rib has a rib height between one and three millimeters.

7. The profile of claim 3, further comprising a second surface opposite the first surface, the second surface describing an exterior of the channel letter.

8. The profile of claim 3, wherein the first rib is plastic and the protective coating is enamel, and wherein the adhesive forms a permanent bond between the first rib and the rule.

9. The profile of claim 3, wherein the face plate is formed of a translucent material allowing light to pass through the face plate.

10. A profile for making a channel letter, comprising:
    a rule having a top edge, a bottom edge, a first surface, and a protective coating, the top edge and the bottom edge being separated by a profile height;
    a first rib bonded to the first surface, the first rib being disposed parallel to a profile axis and separated from the top edge by a distance that is substantially the same as a thickness of a face plate;
    a second rib bonded to the first surface, the second rib being disposed parallel to the profile axis and between the bottom edge and the first rib; and
    one or more cuts made in the first rib, the second rib, and the first surface, the one or more cuts being substantially transverse to the profile axis, the one or more cuts allowing the profile to bend and form the channel letter.

11. The profile of claim 10, wherein the first rib and the second rib are bonded to the rule with an adhesive.

12. The profile of claim 10, wherein the second rib is separated from the bottom edge by a first distance that is substantially the same as a thickness of a bottom plate.

13. The profile of claim 12, wherein the bottom plate is translucent.

* * * * *